United States Patent
Hirai et al.

(10) Patent No.: US 9,129,414 B2
(45) Date of Patent: Sep. 8, 2015

(54) IMAGE COMPOSITING APPARATUS, IMAGE COMPOSITING METHOD, IMAGE COMPOSITING PROGRAM, AND RECORDING MEDIUM

(75) Inventors: Yoshihito Hirai, Bunkyo-ku (JP); Takeshi Miura, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 13/824,889

(22) PCT Filed: Oct. 14, 2011

(86) PCT No.: PCT/JP2011/073713
§ 371 (c)(1),
(2), (4) Date: Mar. 18, 2013

(87) PCT Pub. No.: WO2013/054446
PCT Pub. Date: Apr. 18, 2013

(65) Prior Publication Data
US 2014/0212065 A1    Jul. 31, 2014

(51) Int. Cl.
*G06K 9/36* (2006.01)
*G06T 5/50* (2006.01)
*H04N 5/232* (2006.01)
*H04N 5/235* (2006.01)
*G06T 5/00* (2006.01)

(52) U.S. Cl.
CPC . *G06T 5/50* (2013.01); *G06T 5/003* (2013.01); *H04N 5/2356* (2013.01); *H04N 5/23235* (2013.01); *G06T 2207/10144* (2013.01); *G06T 2207/20208* (2013.01); *H04N 5/23248* (2013.01)

(58) Field of Classification Search
USPC .......................................................... 382/284
See application file for complete search history.

(56) References Cited

U.S. PATENT DOCUMENTS

| | | | |
|---|---|---|---|
| 7,463,296 B2 * | 12/2008 | Sun et al. | 348/254 |
| 2005/0117799 A1 | 6/2005 | Fuh et al. | |
| 2009/0207258 A1* | 8/2009 | Jang et al. | 348/208.1 |
| 2010/0091119 A1 | 4/2010 | Lee | |
| 2011/0150357 A1 | 6/2011 | Prentice | |

(Continued)

FOREIGN PATENT DOCUMENTS

| | | | |
|---|---|---|---|
| JP | 10-191136 A | 7/1998 | |
| JP | 3110797 B2 | 11/2000 | |

(Continued)

OTHER PUBLICATIONS

International Preliminary Report on Patentability in International Application No. PCT/JP2012/072242 mailed Apr. 24, 2014.

(Continued)

*Primary Examiner* — Yon Couso
(74) *Attorney, Agent, or Firm* — Sughrue Mion, PLLC

(57) ABSTRACT

A device is provided that generates a composite image using a first image and a second image having different exposure conditions. The device includes an image input unit, a likelihood calculating unit, an exposure estimating unit, and a compositing unit. The image input unit inputs the first image and the second image. The likelihood calculating unit calculates a subject motion likelihood at each pixel based on a difference between the first image and the second image. The exposure estimating unit estimates an exposure transform function that conforms the exposure conditions of the first image and the second image to each other based on the subject motion likelihood. The compositing unit composites the first image and the second image by using the exposure transform function.

19 Claims, 15 Drawing Sheets

(56) References Cited

U.S. PATENT DOCUMENTS

| | | | |
|---|---|---|---|
| 2011/0188744 A1 | 8/2011 | Sun | |
| 2012/0038793 A1* | 2/2012 | Shimizu et al. | 348/231.99 |
| 2012/0218442 A1* | 8/2012 | Jandhyala et al. | 348/239 |
| 2013/0051700 A1* | 2/2013 | Jo | 382/284 |
| 2014/0313369 A1* | 10/2014 | Kageyama et al. | 348/223.1 |

FOREIGN PATENT DOCUMENTS

| | | | |
|---|---|---|---|
| JP | 2002-190983 A | 7/2002 | |
| JP | 2005-065119 A | 3/2005 | |
| JP | 2005-130054 A | 5/2005 | |
| JP | 2006148550 A | 6/2006 | |
| JP | 2007-221423 A | 8/2007 | |
| JP | 2008289120 A | 11/2008 | |
| JP | 2008-301043 A | 12/2008 | |
| JP | 2010-045510 A | 2/2010 | |
| JP | 2010-258885 A | 11/2010 | |
| JP | 4638361 B2 | 2/2011 | |
| JP | 2011-171842 A | 9/2011 | |
| JP | 2011-188277 A | 9/2011 | |
| JP | 2013-102554 A | 5/2013 | |

OTHER PUBLICATIONS

Office Action issued by Japanese Patent Office in Japanese Patent Application No. 2013-175399 mailed Apr. 15, 2014.
Office Action issued by the Japanese Patent Office in Japanese Patent Application No. 2012-558101 dated May 21, 2013.
International Preliminary Report on Patentability in International Application No. PCT/JP2011/073713 mailed Apr. 24, 2014.
International Search Report in International Application No. PCT/JP2011/073713 dated Jan. 17, 2012.
International Search Report in International Application No. PCT/JP2012/072242 dated Oct. 9, 2012.
Communication dated Feb. 10, 2015 from the Japanese Patent Office in counterpart application No. 2013-538473.
Zijian Zhu et al, "Real-time ghost removal for composing high dynamic-range images", Industrial Electronics and Applications(ICIEA), 2010 the 5th IEEE Conference on, Jun. 15, 2010, p. 1627-p. 1631, XP031711571.
Heikkilae M et al, "A Texture-Based Method for Modeling the Background and Detecting Moving Objects", IEEE Transactions on Pattern Analysis and Machine Intelligence, IEEE Computer Society, vol. 28, No. 4, Apr. 1, 2006, p. 657-p. 662, XP001523373.
Communication dated Mar. 17, 2015 from the United States Patent and Trademark Office in counterpart U.S. Appl. No. 14/114,786.
Communication dated Mar. 9, 2015 from the European Patent Office in counterpart application No. 11874110.7.
Communication dated Jul. 3, 2015 from the State Intellectual Property Office of the People's Republic of China in counterpart application No. 201180004309.2.

* cited by examiner (A)

(B)

(A)

(B)

IMAGE COMPOSITING APPARATUS, IMAGE COMPOSITING METHOD, IMAGE COMPOSITING PROGRAM, AND RECORDING MEDIUM

CROSS REFERENCE TO RELATED APPLICATIONS

This application is a National Stage of International Application No. PCT/JP2011/073713 filed Oct. 14, 2011 the contents of all of which are incorporated herein by reference in their entirety.

TECHNICAL FIELD

The present invention relates to an image compositing device, an image compositing method, an image compositing program, and a recording medium.

BACKGROUND ART

Conventionally, an image compositing device that performs High Dynamic Range (HDR) composition is known (refer to Patent Literature 1). This device enlarges an apparent dynamic range of a video signal by compositing a plurality of images generated sequentially under different exposure conditions. As a result, "whiteout" or "blackout" (a portion with an excessively high or low luminance level) that is created under a backlit situation is resolved. In addition, the device performs HDR composition after respectively transforming coordinates of a plurality of images in correspondence with imaging misalignments over time of the plurality of images caused by camera shake. Specifically, HDR composition is performed based on motion information of an image using a common area portion of two images. As a result, a misalignment (screen blur) of a screen (imaging device) with respect to a subject is resolved.

CITATION LIST

Patent Literature

Patent Literature 1: Patent Publication No. 3110797

SUMMARY OF INVENTION

Technical Problem

When a subject is a moving body, subject positions differ among a plurality of sequentially generated images. For this reason, the image compositing device according to Patent Literature 1 performs composition by assuming that a change in color due to a motion of the subject is a change in color caused by a difference in exposure. Consequently, there is a risk that an appropriate composite image may not be generated. There are demands in the art for an image compositing device, an image compositing method, and an image compositing program capable of generating an appropriate composite image even when a subject moves, and for a recording medium that stores the image compositing program.

Solution to Problem

An image compositing device according to an aspect of the present invention is an device that generates a composite image by using a first image and a second image having different exposure conditions. The device comprises an input unit, a likelihood calculating unit, an exposure estimating unit, and a compositing unit. The input unit inputs the first image and the second image. The likelihood calculating unit calculates a subject motion likelihood at each pixel based on a difference between the first image and the second image. The exposure estimating unit estimates an exposure transform function that conforms the exposure conditions of the first image and the second image to each other based on the subject motion likelihood. The compositing unit composites the first image and the second image by using the exposure transform function.

The image compositing device calculates a subject motion likelihood at each pixel based on a difference between the first image and the second image before conforming the exposures of the first image and the second image to each other. Subsequently, based on the subject motion likelihood, the image compositing device estimates an exposure transform function that conforms the exposure conditions of the first image and the second image to each other. As described above, since a subject motion likelihood is considered when conforming exposures to each other, for example, exposures can be conformed to each other with the exception of a region in which a change in color may have occurred due to a motion of a subject. Consequently, an appropriate composite image can be generated.

In an embodiment, the image compositing device may further comprise a normalizing unit that normalizes pixel values of the first image and the second image, wherein the likelihood calculating unit may calculate the subject motion likelihood at each pixel based on a difference between the normalized images and the normalized and second images. By adopting such a configuration, a subject motion likelihood at each pixel can be appropriately calculated.

In an embodiment, the likelihood calculating unit may use a plurality of first processed images obtained by respectively intergrading resolutions of the first image and a plurality of second processed images obtained by respectively intergrading resolutions of the second image for calculating a difference of each pixel for each resolution, and may calculate the subject motion likelihood at each pixel by weighting a difference obtained for each resolution. By adopting such a configuration, a subject motion likelihood at each pixel can be accurately calculated.

In an embodiment, the likelihood calculating unit may weight the difference obtained for each resolution based on a reliability of the difference between the first image and the second image and based on an image size or a resolution of the first processed image or the second processed image. By adopting such a configuration, a subject motion likelihood at each pixel can be calculated even more accurately.

In an embodiment, the exposure estimating unit may select a sampling point for deriving the exposure transform function based on the subject motion likelihood at each pixel. By adopting such a configuration, for example, since a sampling point for deriving an exposure transform function can be selected while excluding a region that may include a motion of a subject, the exposure transform function can be accurately estimated. Consequently, an appropriate composite image can be generated.

In an embodiment, the exposure estimating unit may determine a weight of a sampling point for deriving the exposure transform function based on the subject motion likelihood at each pixel. By adopting such a configuration, since a weight corresponding to the subject motion likelihood can be set to a sampling point for deriving an exposure transform function, the exposure transform function can be accurately estimated. Consequently, an appropriate composite image can be generated.

In an embodiment, the higher the subject motion likelihood at each pixel, the smaller the weight of a sampling point for deriving the exposure transform function which may be determined by the exposure estimating unit. By adopting such a configuration, since a small weight can be set to a sampling point for an exposure transform function acquired from a region that has a high possibility of including a motion of the subject, the exposure transform function can be accurately estimated. Consequently, an appropriate composite image can be generated.

In an embodiment, the compositing unit may calculate a subject motion likelihood at each pixel based on a difference between the first image and the second image, and may composite the first image and the second image by using the subject motion likelihood and the exposure transform function. By adopting such a configuration, since compositing can be performed in consideration of a motion of the subject, an appropriate composite image can be generated.

In an embodiment, the compositing unit may generate a luminance base mask representing a composition ratio of pixel values of the first image and the second image based on a magnitude of an original luminance value of the first image or the second image. In addition, the compositing unit may generate a subject blur mask representing a composition ratio of pixel values of the first image and the second image based on the difference between the first image and the second image. Furthermore, the compositing unit may combine the luminance base mask and the subject blur mask to generate a compositing mask for compositing pixel values of the first image and the second image.

By adopting such a configuration, in a state in which exposures have been conformed to each other, a subject blur mask which differs from the luminance base mask for compositing with reference to a luminance value can be generated based on the difference between the first image and the second image. Therefore, a region in which a subject blur occurs can be exclusively composited by a different process. As a result, a composite image in which subject blur is reduced can be generated.

In an embodiment, the compositing unit may calculate a subject motion likelihood at each pixel based on the difference between the first image and the second image, and may generate the subject blur mask based on the subject motion likelihood. By adopting such a configuration, a subject blur mask can be generated by identifying a region in which a subject blur occurs based on the subject motion likelihood.

In an embodiment, the compositing unit may use a plurality of first processed images obtained by respectively intergrading resolutions of the first image and a plurality of second processed images obtained by respectively intergrading resolutions of the second image for calculating a difference of each pixel for each resolution, calculate the subject motion likelihood at each pixel by weighting a difference obtained for each resolution, and generate the subject blur mask using the subject motion likelihood. By adopting such a configuration, a subject motion likelihood at each pixel can be accurately calculated.

In an embodiment, the compositing unit may detect regions in which pixels with a subject motion likelihood being equal to or lower than a predetermined threshold are adjacent to each other, attach an identification label to each region, and generate the subject blur mask for each region. By adopting such a configuration, the compositing can be performed appropriately even when moving bodies that move differently exist in an image.

In an embodiment, the compositing unit may generate, as the subject blur mask, a first mask that forces a pixel value with a lower luminance value to be selected from among the first image and the second image or a second mask that forces a pixel value with a higher luminance value to be selected from among the first image and the second image. By adopting such a configuration, a selection of any one of the first image and the second image can be forced for a region in which a subject may possibly be moving. Therefore, a situation in which the subject is doubly or triply misaligned in an image after composition due to motion of the subject can be avoided.

In an embodiment, the compositing unit may generate the compositing mask by multiplying the luminance base mask with an inverted mask of the first mask or by adding the second mask to the luminance base mask. By adopting such a configuration, a compositing mask for appropriately correcting a blur of a subject can be generated.

In an embodiment, the image compositing device may further comprise a motion information acquiring unit that acquires motion information of a pixel between the first image and the second image. In addition, the likelihood calculating unit may correct the first image and the second image based on the motion information, and calculate the subject motion likelihood at each pixel using the corrected first and second images. By adopting such a configuration, even in a case in which an imaging device moves relative to a subject, the subject motion likelihood at each pixel can be calculated by correcting the motion of the imaging device.

In an embodiment, the first image may be an image being a composite of images with different exposure conditions. By adopting such a configuration, a final composite image can be generated by sequentially compositing a plurality of images with different exposure conditions.

In addition, an image compositing method according to another aspect of the present invention is an method of generating a composite image by using a first image and a second image having different exposure conditions. In this method, the first image and the second image are inputted. A subject motion likelihood at each pixel is calculated based on a difference between the first image and the second image. Subsequently, based on the subject motion likelihood, an exposure transform function that conforms the exposure conditions of the first image and the second image to each other is estimated. Furthermore, the first image and the second image are composited using the exposure transform function.

Furthermore, an image compositing program according to yet another aspect of the present invention is a program that causes a computer to operate so as to generate a composite image by using a first image and a second image having different exposure conditions. The program causes the computer to operate as an input unit, a likelihood calculating unit, an exposure estimating unit, and a compositing unit. The input unit inputs the first image and the second image. The likelihood calculating unit calculates a subject motion likelihood at each pixel based on a difference between the first image and the second image. The exposure estimating unit estimates an exposure transform function that conforms the exposure conditions of the first image and the second image to each other based on the subject motion likelihood. The compositing unit composites the first image and the second image by using the exposure transform function.

Moreover, a recording medium according to still another aspect of the present invention is a recording medium on which is recorded an image compositing program that causes a computer to operate so as to generate a composite image by using a first image and a second image having different exposure conditions. The program causes the computer to operate as an input unit, a likelihood calculating unit, an exposure estimating unit, and a compositing unit. The input unit inputs the first image and the second image. The likelihood calculating unit calculates a subject motion likelihood at each pixel based on a difference between the first image and the second image. The exposure estimating unit estimates an exposure transform function that conforms the exposure conditions of the first image and the second image to each other based on the subject motion likelihood. The compositing unit composites the first image and the second image using the exposure transform function.

The image compositing method, the image compositing program, and the recording medium according to the other aspects of the present invention achieve similar advantages as the image compositing device described earlier.

Advantageous Effects of Invention

The various aspects and embodiments of the present invention provide an image compositing device, an image compositing method, and an image compositing program capable of generating an appropriate composite image even when a subject moves, and a recording medium that stores the image compositing program.

BRIEF DESCRIPTION OF DRAWINGS

FIG. 11 is a schematic diagram explaining a compositing mask, in which FIG. 11(A) is a graph showing examples of an exposure transform function, and FIG. 11(B) is a graph showing an example of weighting when splicing exposure transform functions together;

FIG. 12 is a schematic diagram explaining a luminance base mask, in which FIG. 12(A) is an example of an input image, and FIG. 12(B) is an example of a luminance base mask;

FIG. 13 is a schematic diagram explaining labeling of a subject blur region of a difference image, in which FIG. 13(A) is an example of a difference image, and FIG. 13(B) is an example of a labeled difference image;

DESCRIPTION OF EMBODIMENTS

Figure 1:
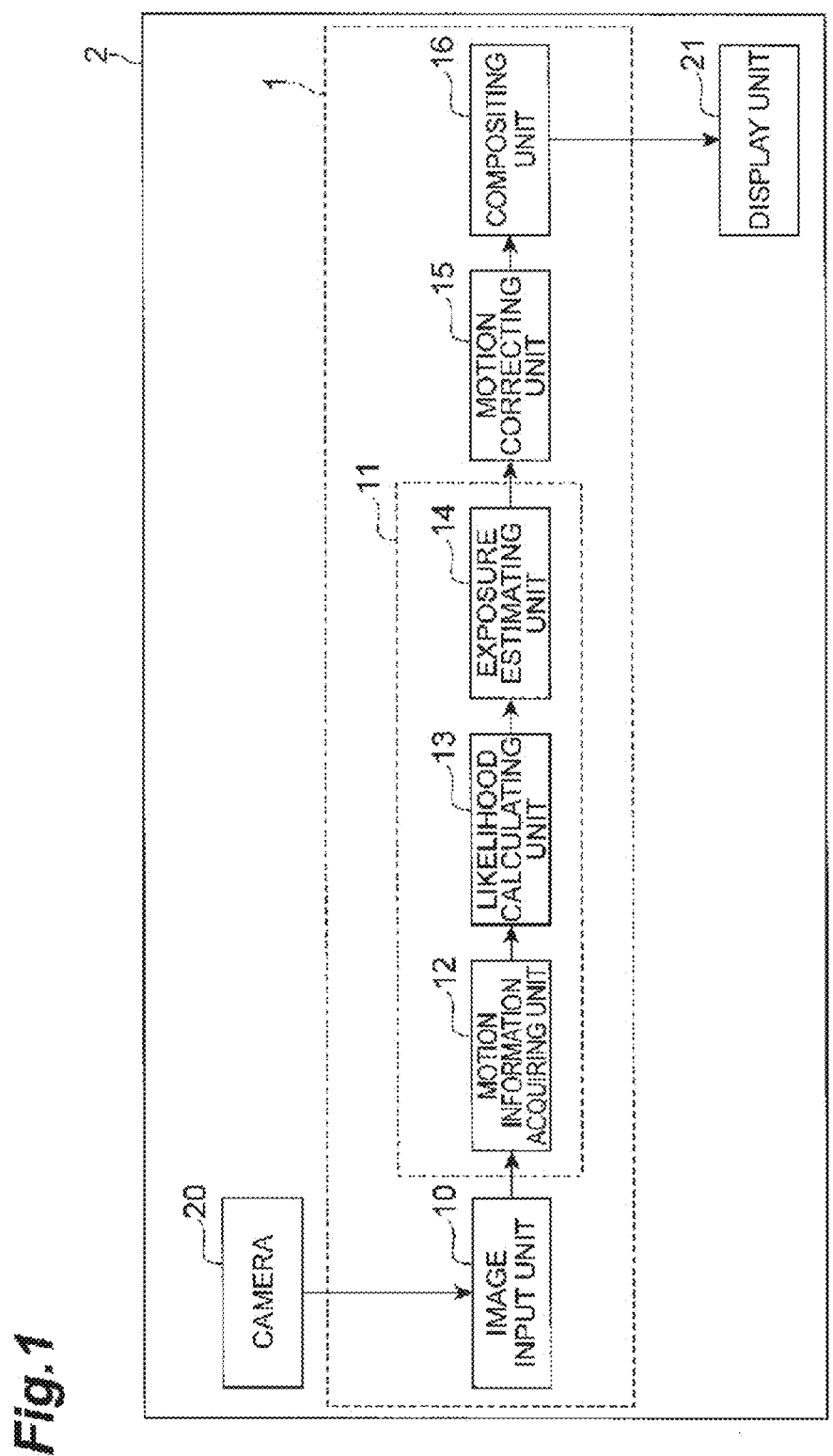
FIG. 1 is a functional block diagram of a mobile terminal mounted with an image compositing device according to an embodiment.

Hereinafter, an embodiment of the present invention will be described with reference to the accompanying drawings. In the drawings, the same or comparable portions are assigned with the same reference characters and redundant descriptions are omitted.

An image compositing device according to the present embodiment is an device that composites a plurality of images under different exposure conditions to generate a single composite image. For example, this image compositing device is adopted when performing HDR composition in which a plurality of images sequentially generated under different exposure conditions are composited in order to enlarge an apparent dynamic range of a video signal. The image compositing device according to the present embodiment is favorably mounted to, for example, a mobile terminal with limited resources such as a mobile phone, a digital camera, and a PDA (Personal Digital Assistant). However, the image compositing device is not limited thereto and may be mounted to, for example, an ordinary computer system. Hereinafter, in consideration of ease of description and understanding, an image compositing device mounted to a mobile terminal equipped with a camera function will be described as an example of the image compositing device according to the present invention.

Figure 2:
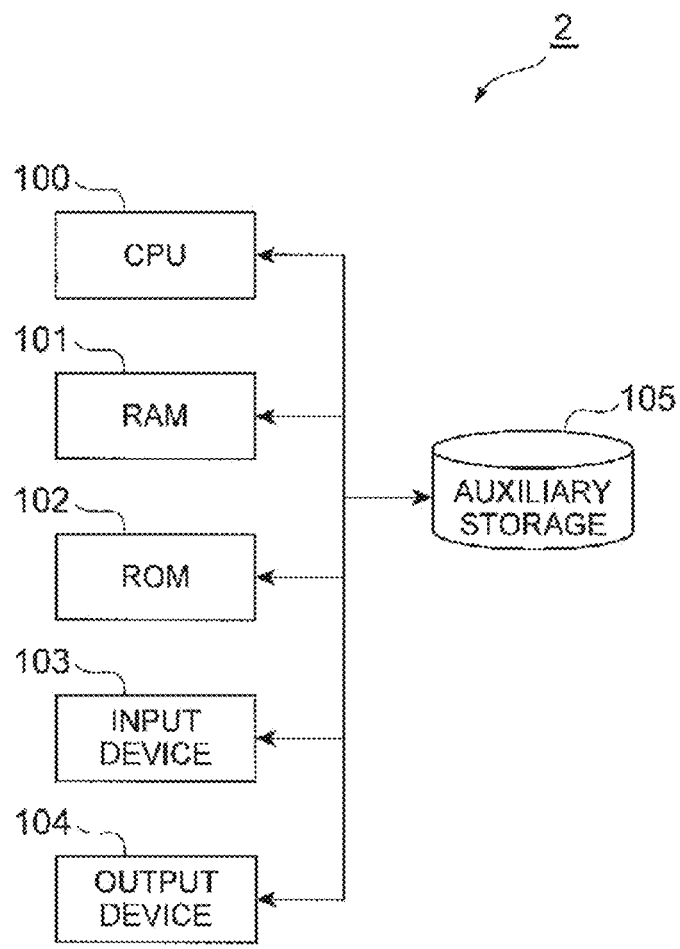
FIG. 2 is a hardware configuration diagram of a mobile terminal mounted with the image compositing device shown in FIG. 1.

FIG. 1 is a functional block diagram of a mobile terminal 2 mounted with an image compositing device 1 according to the present embodiment. For example, the mobile terminal 2 shown in FIG. 1 is a mobile terminal that is carried around by a user and has a hardware configuration shown in FIG. 2. FIG. 2 is a hardware configuration diagram of the mobile terminal 2. As shown in FIG. 2, the mobile terminal 2 is physically constructed as an ordinary computer system comprising a CPU (Central Processing Unit) 100, a main storage such as a ROM (Read Only Memory) 101 and a RAM (Random Access Memory) 102, an input device 103 such as a camera or a keyboard, an output device 104 such as a display, an auxiliary storage 105 such as a hard disk, and the like. Respective functions (to be described later) of the mobile terminal 2 and the image compositing device 1 are realized by loading predetermined computer software onto hardware such as the CPU 100, the ROM 101, the RAM 102, or the like, and by having the CPU 100 control operations of the input device 103 and the output device 104 and control reading data from and writing data to the main storage or the auxiliary storage 105. While a hardware configuration of the mobile terminal 2 has been described above, alternatively, the image compositing device 1 may be configured as an ordinary computer system comprising the CPU 100, a main storage such as the ROM 101 and the RAM 102, the input device 103, the output device 104, the auxiliary storage 105, and the like. Moreover, the mobile terminal 2 may comprise a communication module or the like.

As shown in FIG. 1, the mobile terminal 2 comprises a camera 20, the image compositing device 1, and a display unit 21. The camera 20 has a function of generating an image. For example, a pixel sensor such as a CMOS is used as the camera 20. For example, the camera 20 has a continuous generating function of generating an image for repetitively performing generating at predetermined intervals from a timing specified by a user operation or the like. In other words, the camera 20 functions to acquire not only a single still image but also a plurality of still images as a group (successive frame images). In addition, the camera 20 functions to perform generating while modifying an exposure condition of each of the successive frame images. In other words, each of the images successively generated by the camera 20 has a different exposure condition. For example, the camera 20 functions to output a generated frame image to the image compositing device 1 each time generation is performed.

The image compositing device 1 comprises an image input unit 10, a preprocessing unit 11, a motion correcting unit 15, and a compositing unit 16.

The image input unit 10 functions to input a frame image generated by the camera 20. For example, the image input unit 10 functions to input a frame image generated by the camera 20 each time generation is performed. In addition, the image input unit 10 functions to save an input frame image in a storage device comprising the mobile terminal 2.

The preprocessing unit 11 performs preprocessing prior to HDR composition. The preprocessing unit 11 comprises a motion information acquiring unit 12, a likelihood calculating unit 13, and an exposure estimating unit 14.

The motion information acquiring unit 12 functions to acquire motion information of a pixel between images. For example, supposing that a first image and a second image are input frame images, motion information of a pixel between the first image and the second image is acquired. For example, a motion vector is used as the motion information. In addition, when three or more input images are inputted from the image input unit 10, the motion information acquiring unit 12 may sort the input images in an order of exposure and acquire motion information between input images with close exposure conditions. By comparing images with close exposure conditions and detecting motion from the images, a decline in motion detection accuracy due to a difference in exposures between images can be avoided. Furthermore, the motion information acquiring unit 12 may select a reference image to which motion information is conformed from a plurality of input images. For example, an image having the largest number of effective pixels among the plurality of input images is adopted as the reference image. In this case, an effective pixel refers to a pixel that is not applicable either to "whiteout" or "blackout". "blackout" or a "whiteout" is determined based on a luminance value. Furthermore, when acquiring motion information using two input images, the motion information acquiring unit 12 may extract a feature point from the input image having higher exposure out of the two input images, and obtain a corresponding point of the feature point from the input image of lower exposure. By performing such an operation, a situation can be avoided in which motion information cannot be acquired due to a point extracted as a feature point in an image of low exposure suffering "whiteout" in an image of high exposure. Alternatively, motion information may be acquired from a gyro sensor or the like. The motion information acquiring unit 12 functions to output the motion information to the likelihood calculating unit 13.

The likelihood calculating unit 13 functions to calculate a likelihood of motion of a subject (a subject motion likelihood) at each pixel. When the subject motion likelihood is high, there is a high the possibility that the subject is in motion and becomes a blur region in a composite image. The likelihood calculating unit 13 corrects a screen motion between input images using motion information. Subsequently, the likelihood calculating unit 13 normalizes pixel values of corresponding pixels in the two input images. For example, the likelihood calculating unit 13 obtains Local Ternary Patterns (LTPs) based on pixel values of neighboring pixels. The three RGB colors are used as the pixel values and 24 pixels are used as the neighboring pixels. Subsequently, the likelihood calculating unit 13 calculates a subject motion likelihood using a difference between normalized images. For example, a difference of a normalized pixel value or, in other words, a mismatching rate of the sign at a pixel of interest according to LTP is calculated as the subject motion likelihood at the pixel of interest.

Alternatively, the likelihood calculating unit 13 may calculate a subject motion likelihood by obtaining multi-resolution of two input images. For example, by intergrading resolutions of the respective input images (a first image and a second image), the likelihood calculating unit 13 creates a plurality of images (a first processed image and a second processed image) of different resolutions. Subsequently, the likelihood calculating unit 13 creates a difference image between the first processed image and the second processed image at the same resolution. The difference image represents a difference between the first processed image and the second processed image and, more specifically, a difference in pixel values. The likelihood calculating unit 13 then calculates a subject motion likelihood at each pixel by weighting a difference image obtained per resolution. A mismatching rate of the sign at each pixel according to LTP is used as the weight (reliability). For example, the count of pairs having significant differences according to LTP is used. Alternatively, further weighting may be applied according to an image size or a resolution of the first processed image or the second processed image. In other words, when the image size is large or the resolution is the high, greater weight can be applied. The likelihood calculating unit 13 functions to output the subject motion likelihood at each pixel to the exposure estimating unit 14.

The exposure estimating unit 14 functions to estimate an exposure transform function for conforming exposure conditions between input images to each other. The exposure transform function is a function for transforming an exposure of each input image to an exposure comparable to that of a reference image. When three or more input images are inputted, the exposure estimating unit 14 may conform exposure conditions of input images with close exposure conditions to each other. By comparing images with close exposure conditions and conforming exposures of the images to each other, a decline in estimation accuracy due to a difference in exposures between images can be avoided.

For example, the exposure estimating unit 14 corrects a motion between input images using motion information. Subsequently, the exposure estimating unit 14 samples luminance values from identical locations on the two motion-corrected input images as a set, and plots a relationship thereof. For example, a Halton sequence is used as coordinates of an input image. Moreover, the exposure estimating unit 14 does not need to adopt a luminance value that is equal to or higher than a predetermined value or a luminance value that is equal to or lower than a predetermined value as a sampling point. For example, luminance values within a range of 10 to 245 are adopted as sampling points. For example, the exposure estimating unit 14 estimates an exposure transform function by fitting the plot results. When $K_i$ denotes an original luminance value of a sampling point i on the first image, $f(K_i)$ denotes an exposure transform function, and $U_i$ denotes an original luminance value of the sampling point i on the second image, then fitting may be performed by the Gauss-Newton method using an error function e provided below.

[Expression 1]

$$e = \Sigma\{(f(K_i) - U_i)^2\} \quad (1)$$

Moreover, the exposure estimating unit 14 performs sampling for deriving the exposure transform function based on the subject motion likelihood at each pixel. For example, the exposure estimating unit 14 selects a sampling point based on a subject motion likelihood at each pixel. For example, the exposure estimating unit 14 provides several thresholds incrementally in stages and samples luminance values starting at a pixel with a low subject motion likelihood. Alternatively, the exposure estimating unit 14 may weight a sampling point based on the subject motion likelihood. For example, an error function e provided below may be minimized to be fitted.

[Expression 2]

$$e = \Sigma\{w_i \cdot (f(K_i) - U_i)^2\} \quad (2)$$

In Expression 2, $w_i$ denotes weight. The higher the subject motion likelihood of a pixel becomes, the smaller the weight $w_i$ set to the pixel. In this manner, by having the exposure estimating unit 14 calculate the exposure transform function based on the subject motion likelihood at each pixel, data of sampling points with lower reliabilities can be prevented from affecting the derivation of the exposure transform function. Moreover, the exposure transform function may be modified so that a transformed input image is kept in an expressible range.

The motion correcting unit 15 functions to correct motion between input images using motion information. The compositing unit 16 uses a compositing mask to composite input images with each other or to composite an image already composited with an input image. A compositing mask is an image representation of a composition ratio (weight) when compositing (alpha blending) images with each other. When there are three or more input images, the compositing unit 16 first composites two input images according to the compositing mask, and then generates a compositing mask of the composite image and the remaining input image and performs the compositing. The compositing unit 16 combines a luminance base mask with a subject blur mask to generate a compositing mask. A luminance base mask is a mask for preventing a "whiteout" region or a "blackout" region from being used for composition by determining weighting to be applied when compositing images based on a luminance value. A subject blur mask is a mask for preventing an occurrence of a phenomenon (ghost phenomenon) in which a subject is displayed doubly or triply overlapped when compositing an image of the subject in motion.

The compositing unit 16 calculates a weight based on an original luminance value of an input image to generate a luminance base mask. For example, a weight is calculated according to the computation formula below.

$$f(x) = 1.0 \quad (x < A) \quad \text{[Expression 3]}$$
$$f(x) = \frac{B - x}{B - A} \quad (A <= x < B)$$
$$f(x) = 0.0 \quad (B <= x)$$

According to the computation formulae above, a weight is appropriately determined and discontinuity in luminance is reduced. Moreover, the compositing mask may be subjected to feathering in order to reduce spatial discontinuity.

The compositing unit 16 calculates a weight based on a difference between input images to generate a subject blur mask. The compositing unit 16 calculates a subject motion likelihood from a difference in pixel values between input images. A difference between pixel values of input images and a subject motion likelihood can be obtained by operating in a similar manner to the likelihood calculating unit 13 described earlier. In addition, the likelihood calculating unit 13 detects subject blur regions in which pixels with a subject motion likelihood that is equal to or lower than a predetermined threshold are adjacent to each other, attaches an identification label to each subject blur region, and generates a subject blur mask for each subject blur region. Moreover, the predetermined threshold may be flexibly modified according to required specifications. Setting a large threshold makes it easier to extract a continuous region. By generating a mask for each subject blur region, a pixel can be selected for each subject blur region from an image with a large amount of information so as to avoid a "whiteout" region or a "blackout" region. In other words, as the subject blur mask, there are a lo_mask (first mask) that forces a pixel value with a low luminance value to be selected among images that are to be composited and a hi_mask (second mask) that forces a pixel value with a high luminance value to be selected among the images that are to be composited. Basically, the compositing unit 16 generates the second mask that causes a pixel value to be selected from a high-exposure image having a large amount of information. However, when a subject blur region is affected by a "whiteout" region in the high-exposure image, the compositing unit 16 generates the first mask. Specifically, the compositing unit 16 generates the first mask when any of the following conditions is satisfied. A first condition is that, among two images to be composited, an area of "whiteout" in a high-exposure image is greater than an area of a "blackout" region in a low-exposure image. A second condition is that, in a high-exposure image among two images to be composited, an area of a "whiteout" region in a subject blur region is equal to or greater than 10% of the subject blur region. Moreover, a case in which a region adjacent to a subject blur region in a high-exposure image among two images to be composited is a "whiteout" region may be adopted as a condition.

The compositing unit 16 combines a luminance base mask with a subject blur mask to generate a compositing mask. For example, the compositing unit 16 multiplies the luminance base mask by an inverted mask of the first mask. Alternatively, the compositing unit 16 adds the second mask to the luminance base mask. The compositing unit 16 composites all input images and outputs a final composite image to the display unit 21. The display unit 21 displays the composite image. For example, a display device is used as the display unit 21.

Figure 3:
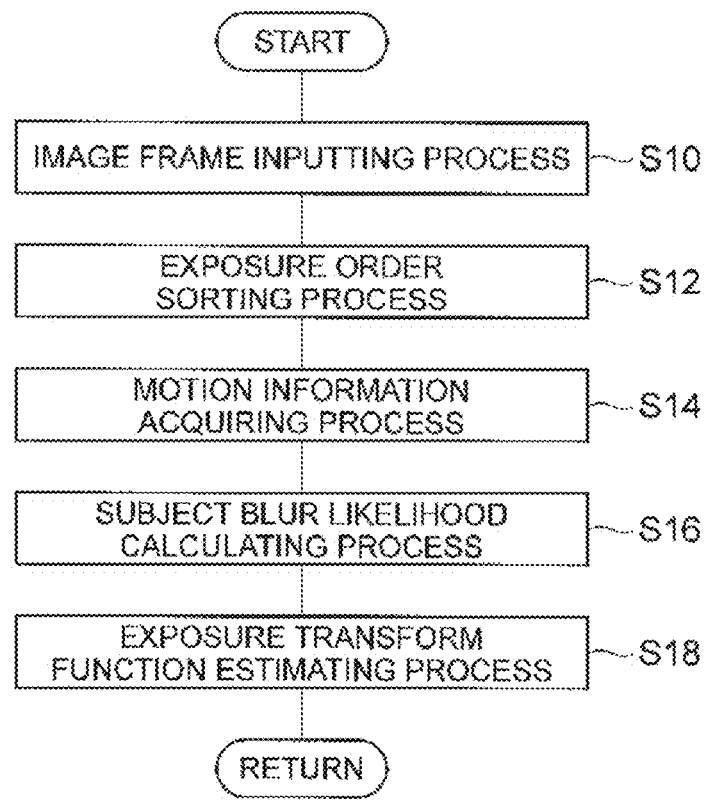
FIG. 3 is a flow chart showing a preprocessing operation of the image compositing device shown in FIG. 1.

Next, operations of the image compositing device 1 will be described. FIG. 3 is a flow chart for explaining preprocessing of HDR composition. For example, a control process shown in FIG. 3 starts when an HDR composition mode is selected by a user and the camera 20 successively generates a plurality of images.

First, the image input unit 10 inputs an image frame (S10). Hereinafter, in consideration of ease of description and understanding, it is assumed that five input images $I_0$ to $I_4$ have been inputted. Once the process of S10 is finished, a transition is made to an exposure order sorting process (S12).

In the process of S12, the motion information acquiring unit 12 sorts the input images $I_0$ to $I_4$ in an order of exposure. For example, the motion information acquiring unit 12 sorts the input images $I_0$ to $I_4$ using average values of luminance values. Here, it is assumed that when the number attached to the input images $I_0$ to $I_4$ becomes smaller, the luminance value thereof becomes lower. In this case, the input images $I_0$ to $I_4$ are sorted in the order of their numbers. Once the process of S12 is finished, a transition is made to a motion information acquiring process (S14).

Figure 4:
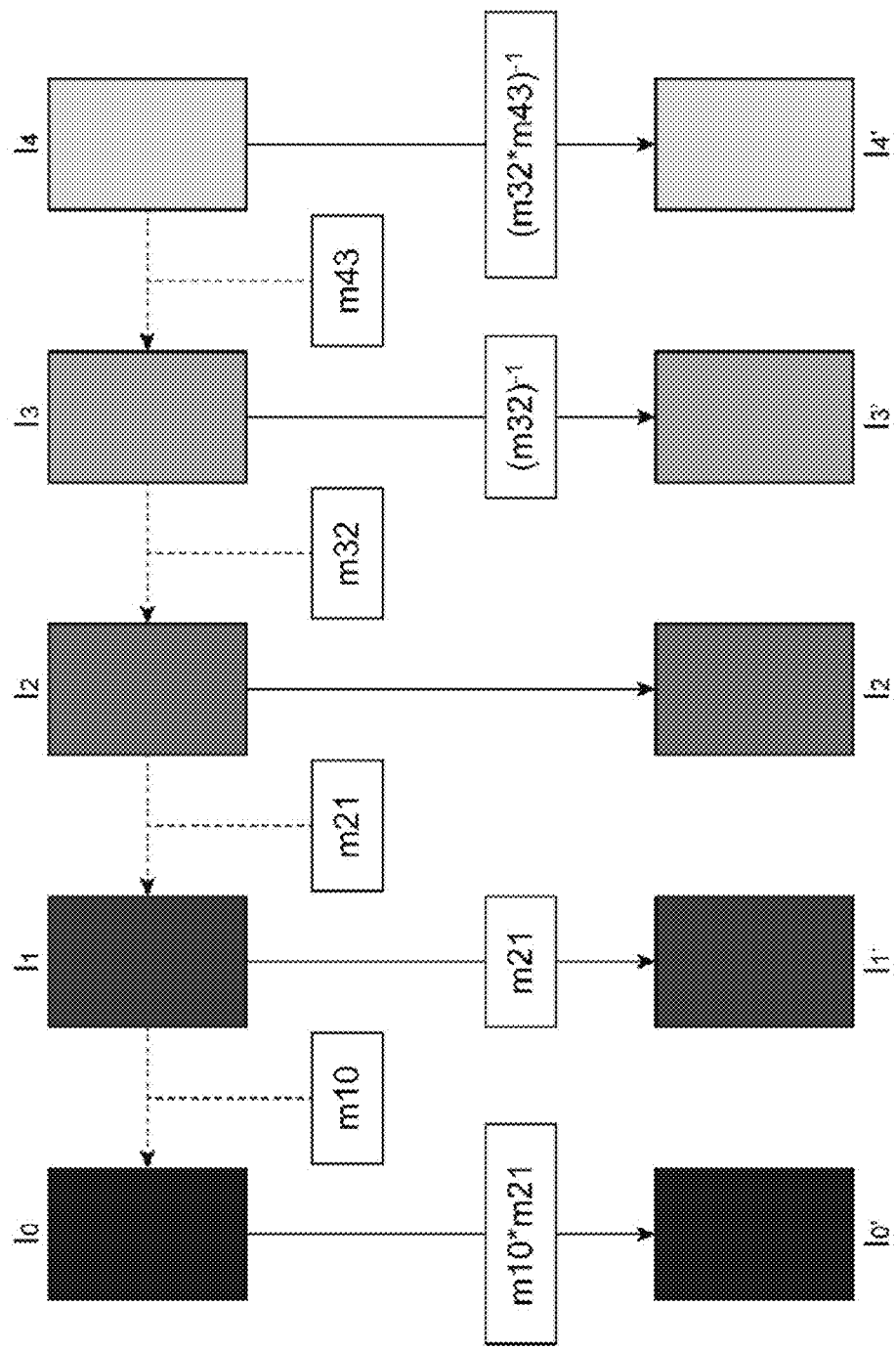
FIG. 4 is a schematic diagram explaining motion detection.

In the process of S14, the motion information acquiring unit 12 acquires motion information between the respective input images $I_0$ to $I_4$. FIG. 4 is a schematic diagram explaining a motion information acquiring process. As shown in FIG. 4, it is assumed that the input images $I_0$ to $I_4$ are arranged from left to right in an ascending order of average luminance values. First, the motion information acquiring unit 12 sets a reference image from among the input images $I_0$ to $I_4$. In this case, the input image $I_2$ is set as the reference image. Next, motion information of input images with close exposure conditions is acquired (for example, the input image $I_0$ and the input image $I_1$ or the input image $I_1$ and the input image $I_2$). The motion information acquiring unit 12 extracts a feature point from an input image having higher exposure between the two input images, and extracts a corresponding point of the extracted feature point from the input image having lower exposure. Due to the motion information, a transformation matrix can be obtained which transforms input images with close exposure conditions into coordinates of a same dimension. FIG. 4 shows transformation matrices m10, m21, m32, and m43 for conforming an image having lower exposure among the input images with close exposure conditions to an image having higher exposure. Next, using the transformation matrices m10, m21, m32, and m43, a transformation matrix is calculated which transforms coordinates of the input images $I_0$, $I_1$, $I_3$, and $I_4$ other than the reference image $I_2$ into coordinates corresponding to the reference image $I_2$. As shown in FIG. 4, a transformation matrix that transforms the input image $I_0$ into the reference image $I_2$ is m10*m21. A transformation matrix that transforms the input image $I_1$ into the reference image $I_2$ is m10. A transformation matrix that transforms the input image $I_3$ into the reference image $I_2$ is $(m32)^{-1}$. A transformation matrix that transforms the input image $I_4$ into the reference image $I_2$ is $(m32*m43)^{-1}$. Hereinafter, the input images after transformation will be denoted as $I_{0'}$ to $I_{4'}$. Once the process of S14 is finished, a transition is made to a subject motion likelihood calculating process (S16).

Figure 5:
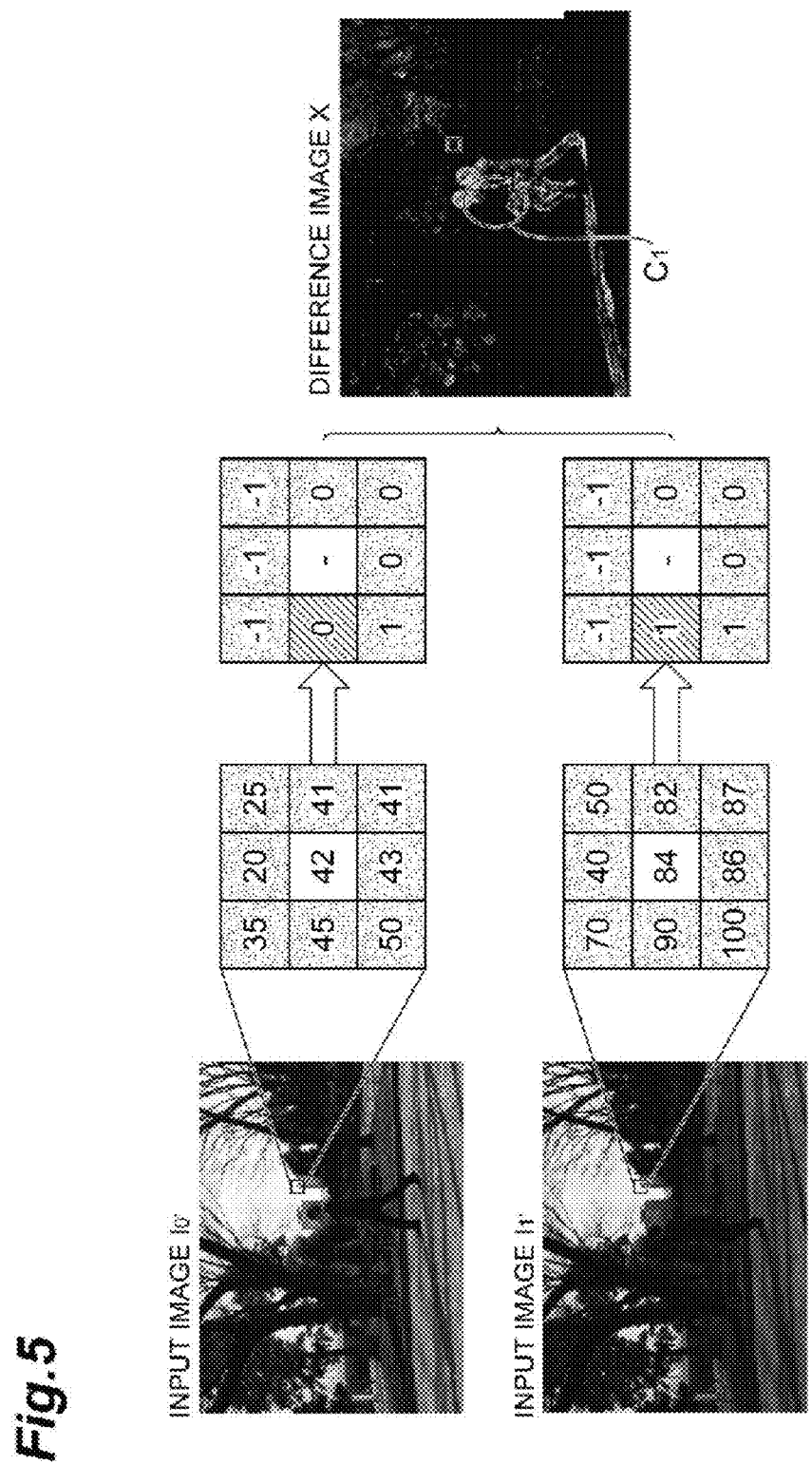
FIG. 5 is a schematic diagram explaining a difference image.

In the process of S16, the likelihood calculating unit 13 calculates a subject motion likelihood between the respective input images $I_{0'}$ to $I_{4'}$. FIG. 5 shows an example of calculating a subject motion likelihood between the input image $I_{0'}$ and the input image $I_{1'}$. Moreover, FIG. 5 shows a case in which an R value is used as a pixel value. As shown in FIG. 5, the likelihood calculating unit 13 acquires pixel values (R values) of eight neighboring pixels of a pixel of interest (R value=42) of the input image $I_{0'}$. Subsequently, normalization is performed using the pixel value of the pixel of interest and the pixel values of the eight neighboring pixels. For example, LTP is used. 0 is assumed when a difference between the pixel value of the pixel of interest and the pixel values of the eight neighboring pixels is within a range of ±5, 1 is assumed when greater than +5, and −1 is assumed when smaller than −5. The likelihood calculating unit 13 performs normalization on the input image $I_{1'}$ in a similar manner. In FIG. 5, normalization is performed on a pixel of the input image $I_{1'}$ corresponding to the pixel of interest of the input image $I_{0'}$. Next, a comparison of pixel values of normalized pixels reveals that a difference exists. A difference image X is an image representation in which a color of a pixel is varied from black to white according to a magnitude of a difference (mismatching rate of the sign). The difference image is an image representation of a subject motion likelihood at each pixel. The number of neighboring pixels need not be limited to eight and may be 24 instead. Furthermore, in addition to R values, G values and B values may be processed in a similar manner.

Figure 6:
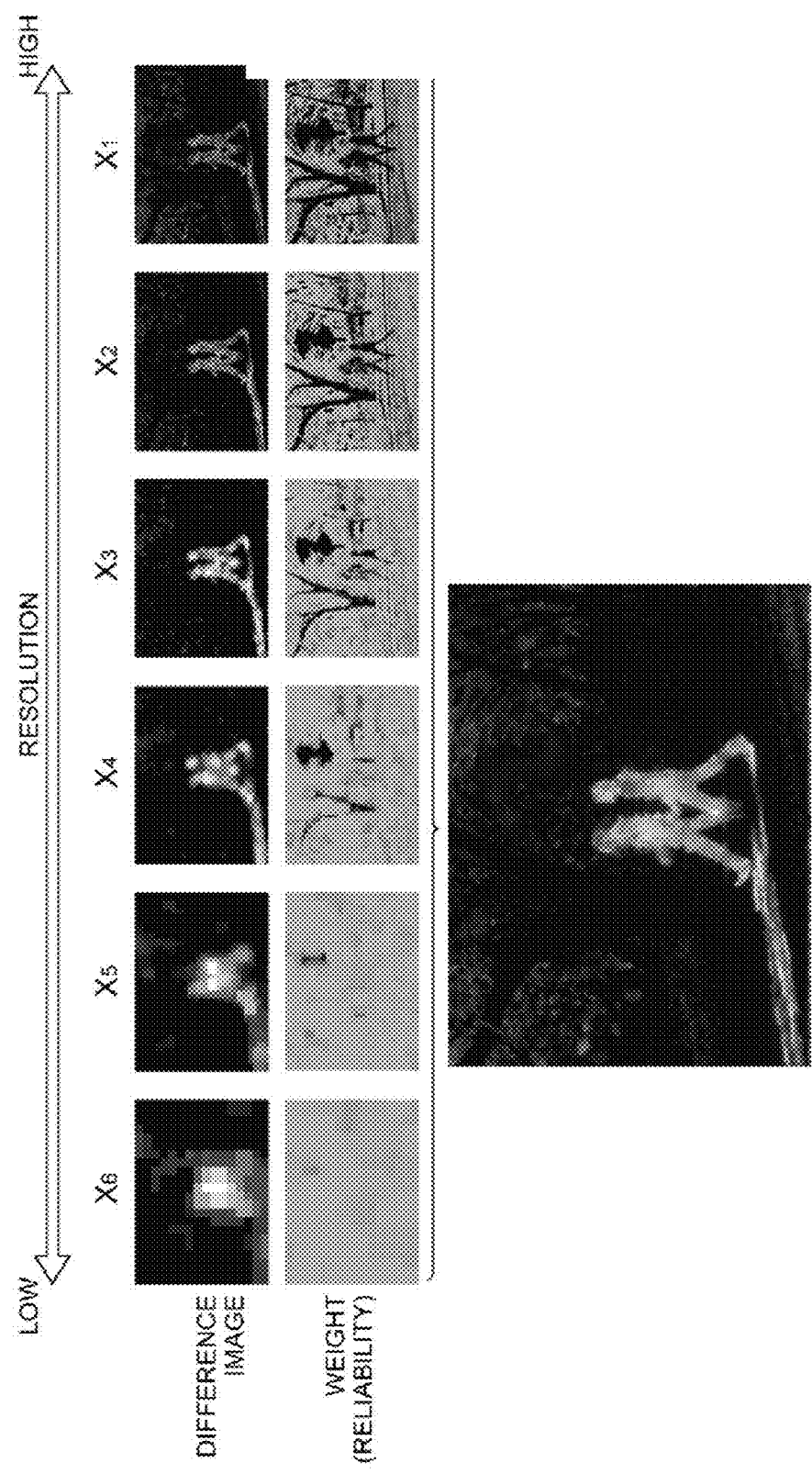
FIG. 6 is a schematic diagram explaining an example of deriving a difference image using multiresolution.

In order to improve accuracy of a subject motion likelihood of a smooth region denoted by a region $C_1$ in the difference image X, the likelihood calculating unit 13 may obtain a subject motion likelihood using multi-resolution of images. FIG. 6 shows an example of obtaining a subject motion likelihood using the multi-resolution of images. First, the likelihood calculating unit 13 generates a plurality of images that represent intergraded resolutions of the input image $I_{0'}$ and the input image $I_{1'}$. The likelihood calculating unit 13 then generates a difference image at the same resolution. The difference image simply represents a subtraction of pixel values. FIG. 6 shows a case in which the input image $I_{0'}$ and the input image $I_{1'}$ are multiplexed in six levels. $X_1$ to $X_6$ denote the respective difference images, in which when the number becomes larger, the resolution of the difference image becomes lower. In addition, when the resolution becomes lower, the image size becomes smaller. The difference images are weighted according to reliability to calculate a final difference image. As for reliability, for example, a product of the number of pairs having significant differences according to the LTP differences described earlier multiplied by an image size (or a resolution) is used. For example, in the case of LTP shown in FIG. 5, there is one pair having a significant difference. In this manner, the number of pairs is multiplied by an image size for each pixel to calculate a weight image (an image representation of weights) corresponding to the difference images $X_1$ to $X_6$. Subsequently, a final difference image is calculated using the difference images $X_1$ to $X_6$ and the weight image. The likelihood calculating unit 13 calculates difference images for the input images $I_{1'}$ to $I_{4'}$ according to a similar method as described above. Once the process of S16 is finished, a transition is made to an exposure transform function estimating process (S18).

Figure 7:
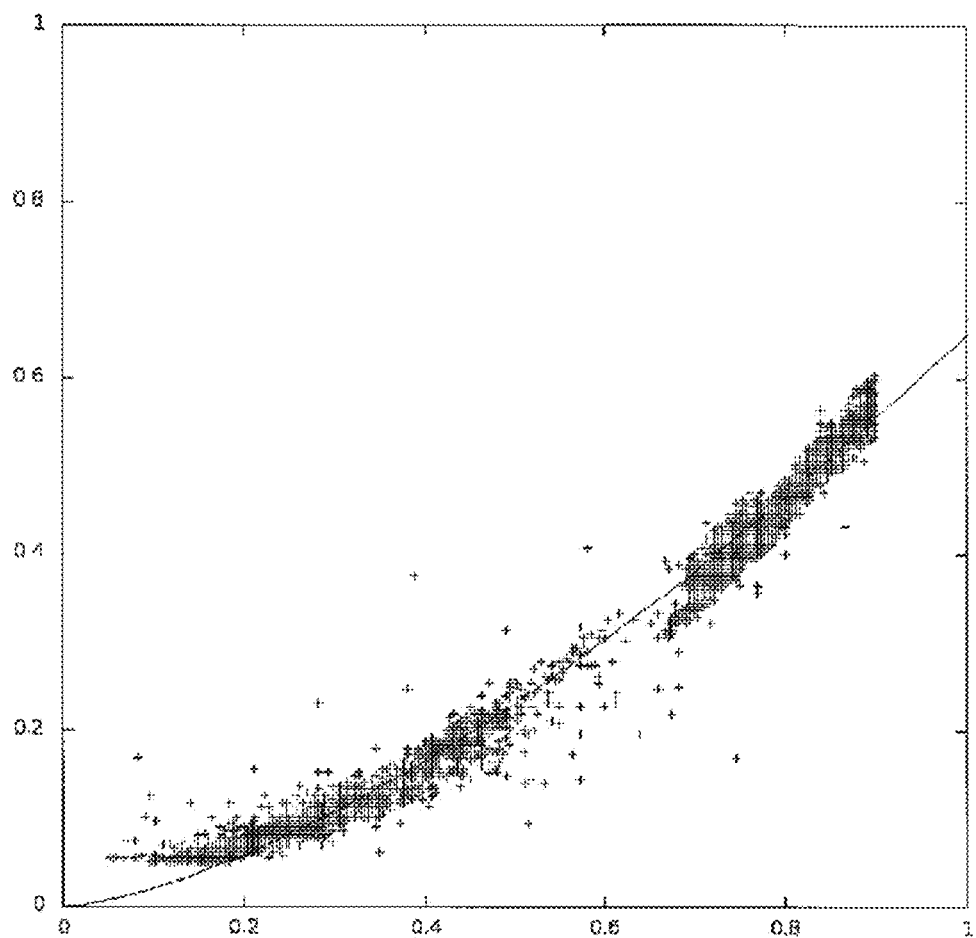
FIG. 7 is a graph showing an example of an exposure transform function.

In the process of S18, the exposure estimating unit 14 estimates an exposure transform function. With the exposure estimating unit 14, when x denotes a luminance value before transformation and y denotes a luminance value after transformation, then an exposure transform function can be expressed by the following expression.

$$y = a \cdot x^b \quad \text{[Expression 4]}$$

where (a, b) denotes an exposure transform parameter. The exposure transform function can be obtained by deriving the exposure transform parameter (a, b). Hereinafter, a case of obtaining an exposure transform function of the input image $I_{0'}$ and the input image $I_{1'}$ after motion correction will be described. At a point (x, y) in the input images, the exposure estimating unit 14 samples several sets of a luminance value of the input image $I_{0'}$ with low exposure and a luminance value of the input image $I_{1'}$ with low exposure, and plots a relationship thereof. In this case, the sampling points are selected based on the difference image acquired by the process of S16. For example, sampling is arranged so as not to be performed from a region with high subject motion likelihood. In other words, sampling is arranged so as to be performed from a region with low subject motion likelihood. In addition, for example, the higher the subject motion likelihood, the lower the weight assigned, and an exposure transform function is estimated using Expression 2. Accordingly, fitting such as that shown in FIG. 7 is performed. The likelihood calculating unit 13 estimates exposure transform functions between the input images $I_{1'}$ to $I_{4'}$ according to a similar method as described above. Moreover, data with luminance values close to 0 or 255 may be excluded.

Figure 8:
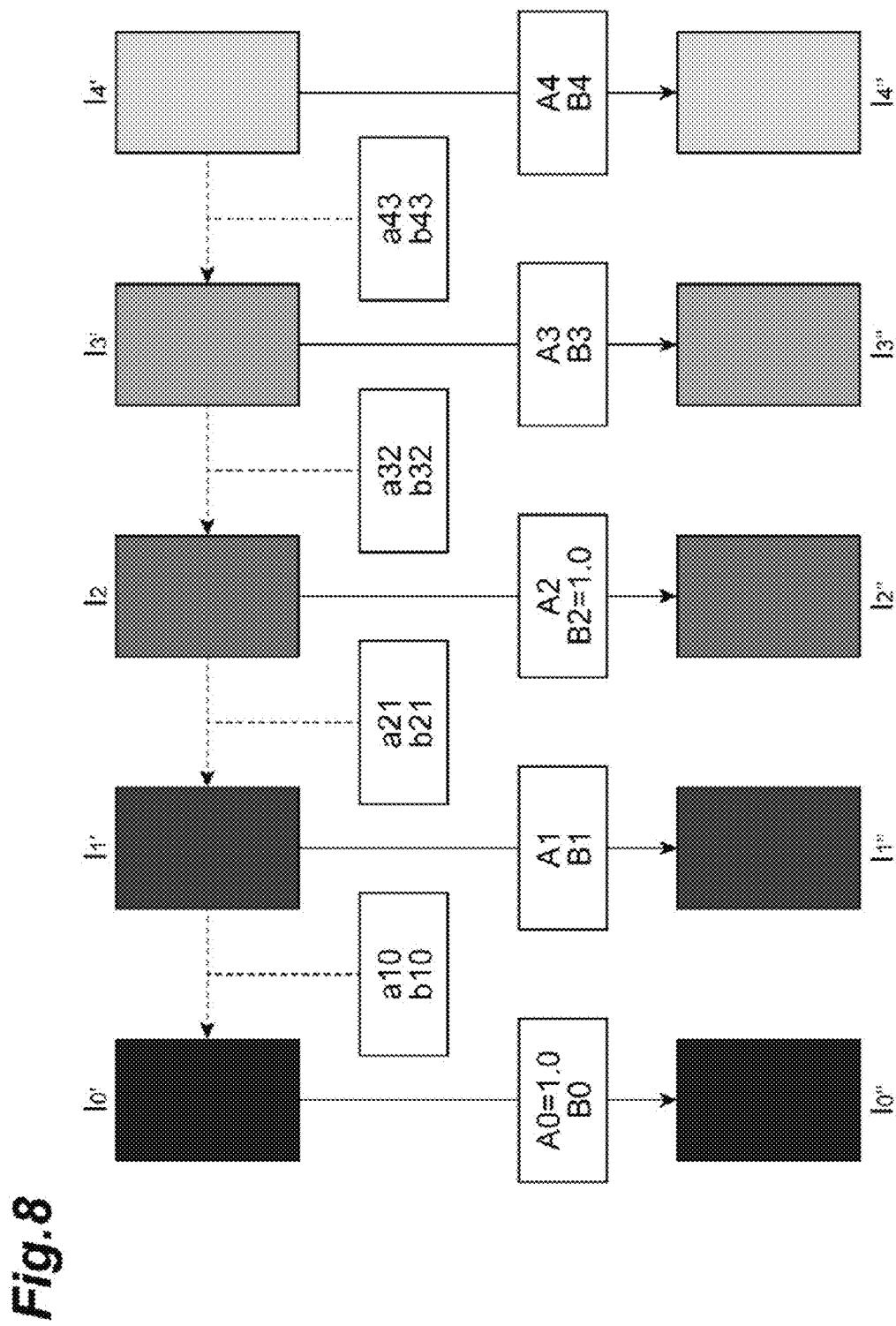
FIG. 8 is a schematic diagram explaining a luminance transform function.

FIG. 8 is a schematic diagram explaining the exposure transform function estimating process described above.

Moreover, FIG. 8 shows exposure transform parameters (a10, b10), (a21, b21), (a32, b32), and (a43, b43) for conforming an image with a lower exposure among input images with close exposure conditions to an image with a higher exposure. In order to ensure that a final composite image is within an expressible range, transformation results may be kept equal to or below 1.0 by setting $A_0$ of an exposure transform parameter $(A_0, B_0)$ of the input image $I_0$ with the lowest exposure to 1.0. In FIG. 8, an image after exposure transformation of the input image $I_0$ is depicted as an input image $I_{0'''}$. In addition, when $(A_2, B_2)$ denotes an exposure transform parameter of the reference image $I_r$ with respect to the input image $I_0$ with the lowest exposure, by setting $A_0$ to 1.0 and also $B_2$ to 1.0, the color thereof can be set to be equal to that of the input image at a gain of $1/A_2$. The likelihood calculating unit 13 separately performs the process described above for each of the RGB channels. Once the process of S18 is finished, the preprocessing shown in FIG. 3 is concluded.

This concludes the control process shown in FIG. 3. Due to the execution of the control process shown in FIG. 3, sampling from a subject blur region can be prevented by detecting a subject blur before estimating an exposure transform function, and the influence of data sampled from a subject blur region can be reduced by weighting. As a result, an exposure transform function can be accurately estimated. With a conventional HDR technique, a subject blur cannot be accurately corrected unless exposure adjustment has been performed and, conversely, exposure cannot be accurately adjusted unless a subject blur has been corrected. However, by detecting a subject blur (a motion of a subject) in a simplified manner before estimating an exposure transform function, the relational deadlock described above can be resolved.

Figure 9:
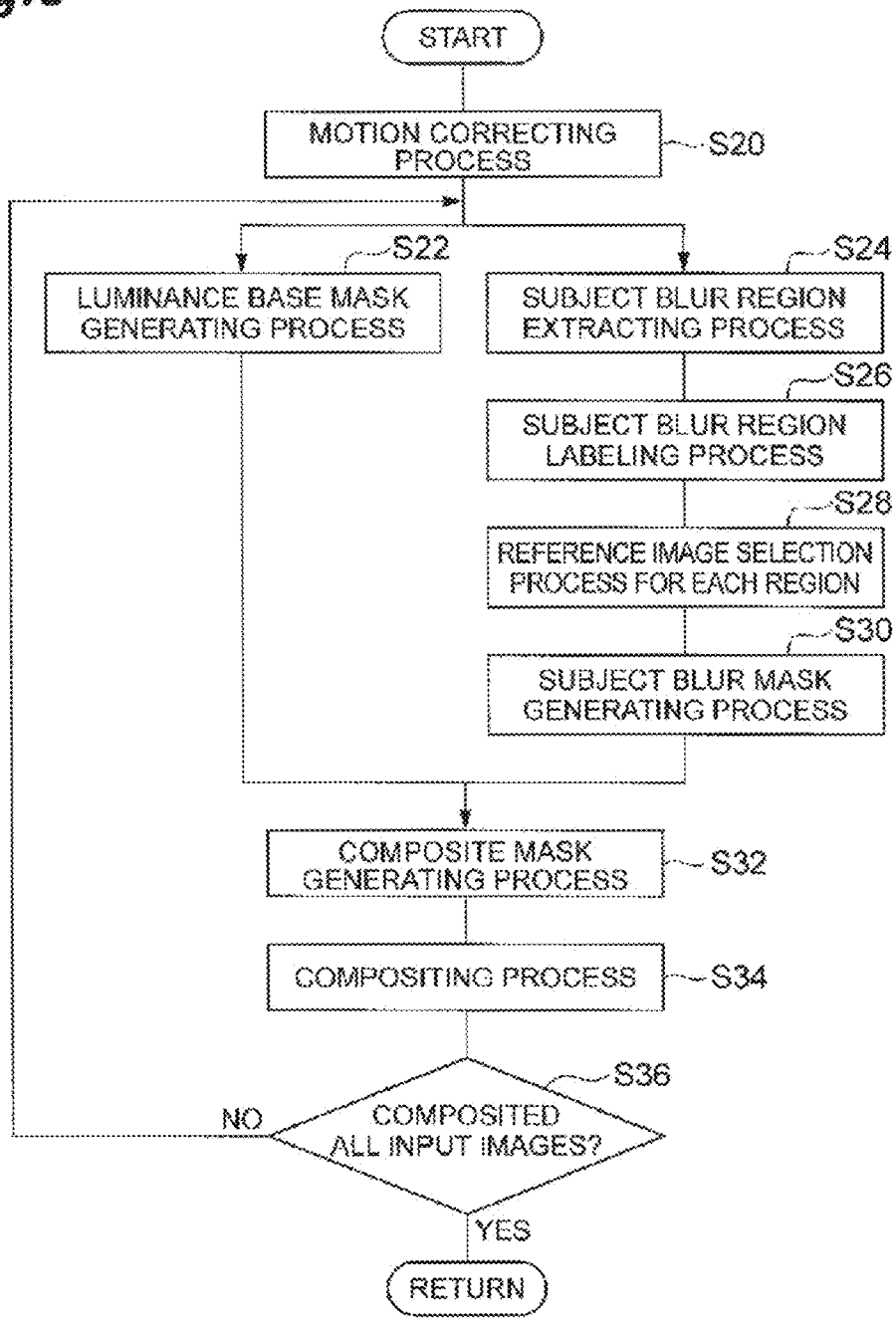
FIG. 9 is a flow chart showing a compositing operation of the image compositing device shown in FIG. 1.

Next, a compositing operation of the image compositing device 1 will be described. FIG. 9 is a flow chart for explaining HDR composition. For example, the control process shown in FIG. 9 starts upon the conclusion of the control process shown in FIG. 3.

As shown in FIG. 9, the motion correcting unit 15 substantially corrects motion (S20). In this process, in a similar manner to the process of S14 shown in FIG. 3, the motion correcting unit 15 uses a transformation matrix to correct motion of the input images $I_{0'''}$ to $I_{4'''}$ after exposure transformation. Alternatively, depending on the accuracy required, a subpixel interpolation algorithm or the like can be made available. Once the process of S20 is finished, a transition is made to a luminance base mask generating process and a subject blur region extracting process (S22 and S24).

Figure 10:
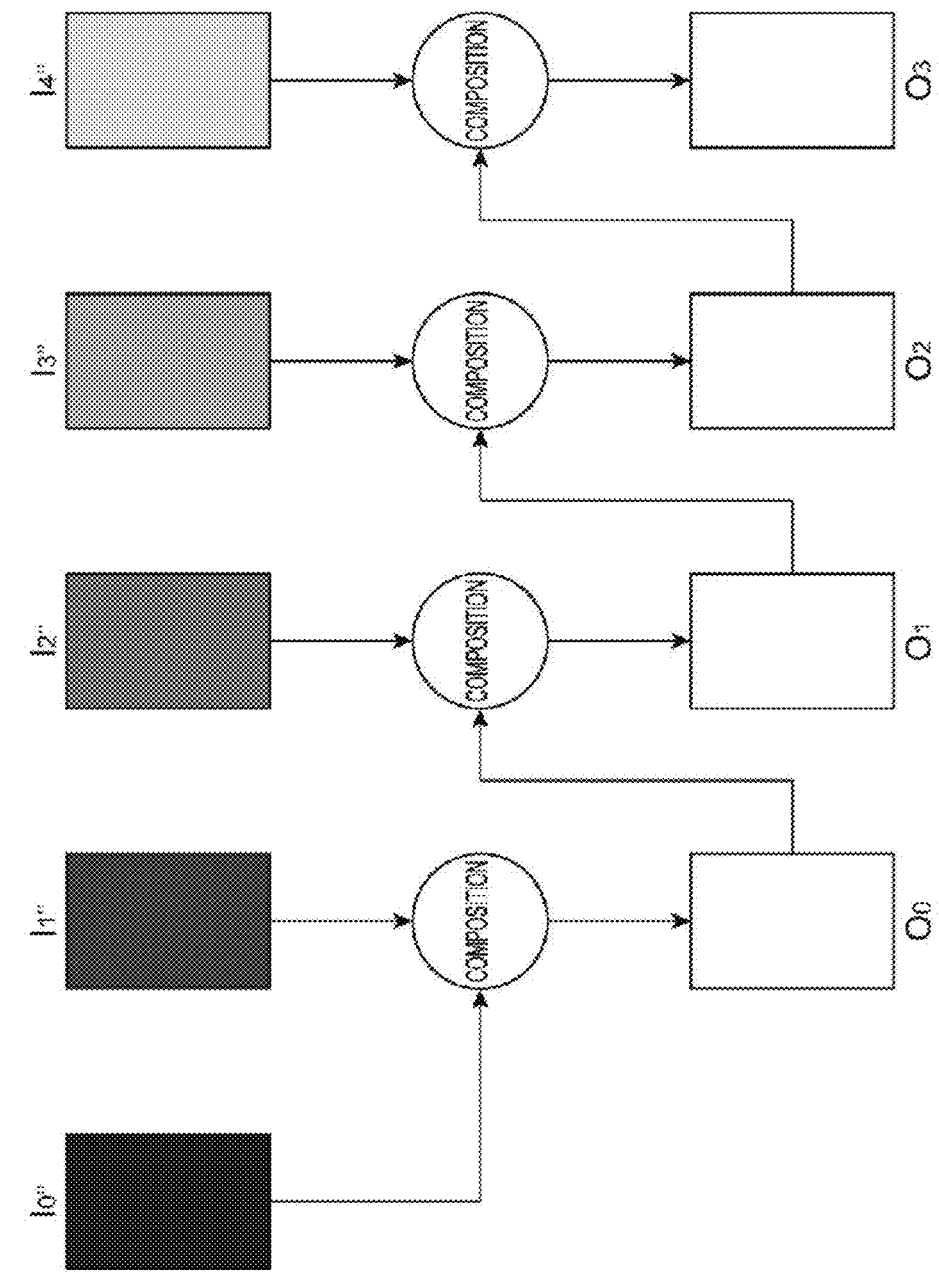
FIG. 10 is a schematic diagram explaining a flow of a compositing process.
Figure 11:
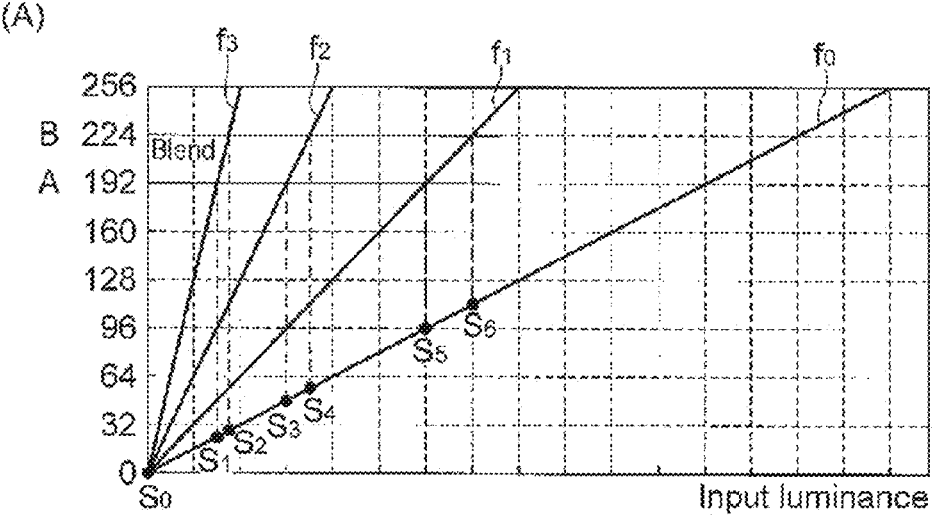
Figure 11:
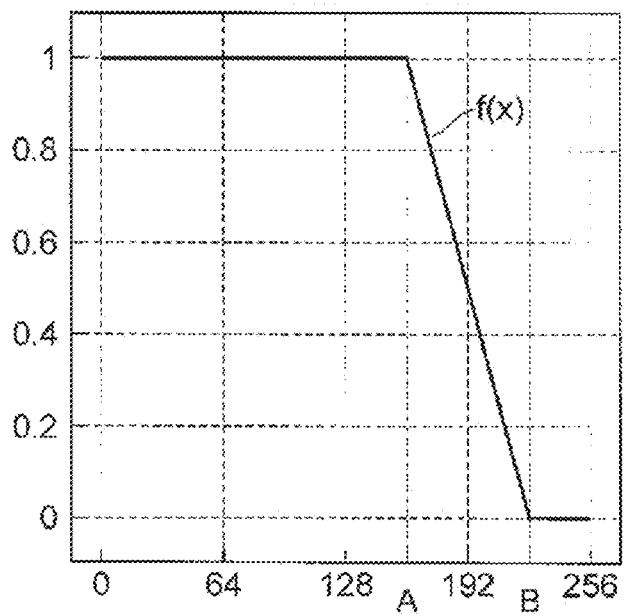
Figure 12:
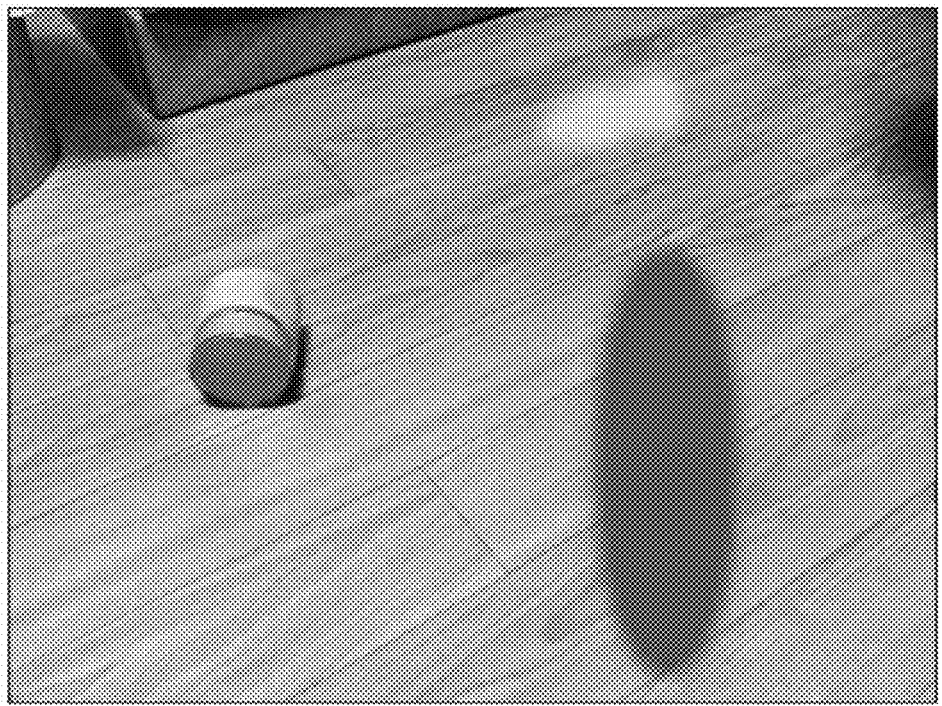
Figure 12:
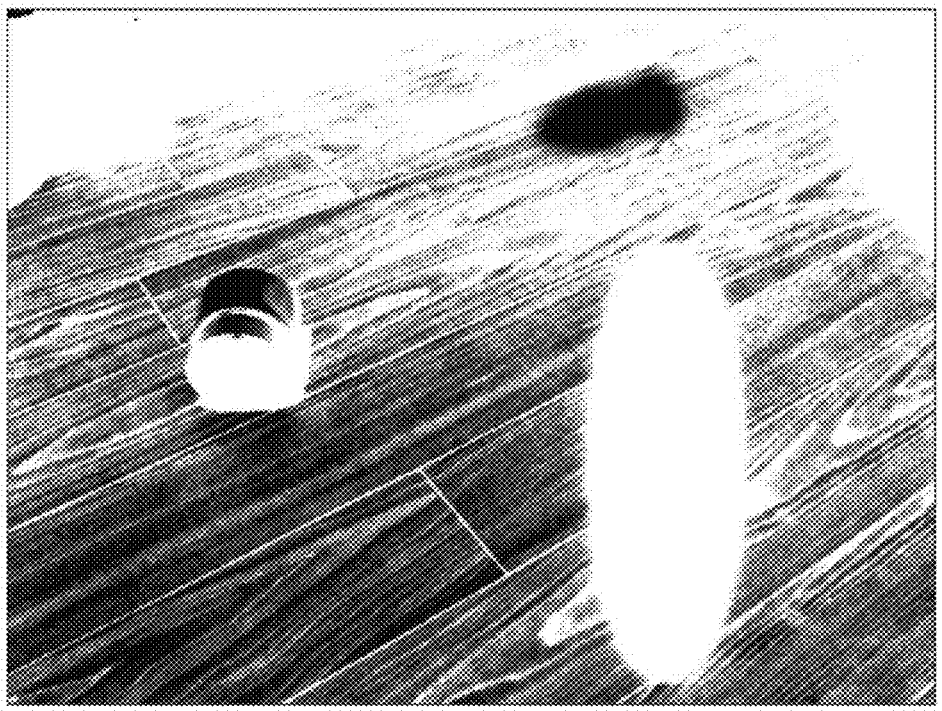

In the process of S22, the compositing unit 16 generates a luminance base mask. FIG. 10 is a schematic diagram explaining a flow of a compositing process. As shown in FIG. 10, compositing is performed by replacing the input images $I_{1'''}$ to $I_{4'''}$ starting with the input image $I_{0'''}$ with a low exposure. Specifically, first, a luminance base mask is generated which determines to what degree the input image $I_{1'''}$ is to be composited with the input image $I_{0'''}$. The luminance base mask calculates a weight from an original luminance value of the input image $I_{1'''}$. For example, a weight in a vicinity of a "whiteout" region is set to 0. By setting a weight in this manner and compositing so as to overlap an image with a high exposure onto an image with a low exposure, an input image with a large amount of information can invariably be selected with respect to a target pixel. FIG. 11(A) shows graphs representing a relationship between input luminance and pixel values. As shown in FIG. 11(A), functions $f_0$ to $f_3$ are graphs indicating a pixel value of which image is to be selected based on a luminance value. The larger the number of the functions $f_0$ to $f_3$ becomes, the higher the exposure of an image to which a function is to be applied. For example, when the input image $I_{0'''}$ with the lowest exposure is inputted, the function $f_0$ is applied and all pixel values are adopted. Next, when the input image $I_{1'''}$ is inputted, the functions $f_0$ and $f_1$ are applied. Therefore, in a luminance value range of S0 to S5, the input image $I_{1'''}$ is adopted, and in a luminance value range of S6 or greater, the input image $I_{0'''}$ is adopted. A composite value blended by a weight shown in FIG. 11(B) is adopted in a luminance value range of S5 to S6. Note that γ correction has been omitted in the description for the sake of simplicity. Next, when the input image $I_{2'''}$ is inputted, the functions $f_0$ to $f_2$ are applied. Therefore, in a luminance value range of S0 to S3, the input image $I_{2'''}$ is adopted, in a luminance value range of S4 to S5, the input image $I_{1'''}$ is adopted, and in a luminance value range of S6 or greater, the input image $I_{0'''}$ is adopted. A composite value blended by a weight shown in FIG. 11(B) is adopted in the luminance value ranges of S3 to S4 and S5 to S6. Next, when the input image $I_{3'''}$ is inputted, the functions $f_0$ to $f_3$ are applied. Therefore, in a luminance value range of S0 to S1, the input image $I_{3'''}$ is adopted, in a luminance value range of S2 to S3, the input image $I_{2'''}$ is adopted, in a luminance value range of S4 to S5, the input image $I_{1'''}$ is adopted, and in a luminance value range of S6 or greater, the input image $I_{0'''}$ is adopted. A composite value blended by a weight shown in FIG. 11(B) is adopted in the luminance value ranges of S1 to S2, S3 to S4, and S5 to S6. As described above, an image with a high exposure is preferentially adopted. In addition, for "whiteout" region portions, an image with a low exposure is adopted and a boundary portion is smoothly blended. An example of a luminance base mask that is an image representation of the graph shown in FIG. 11(A) is shown in FIG. 12. FIG. 12(A) shows an input image and FIG. 12(B) shows a luminance base mask of the input image. In FIG. 12(B), use of 100% of a pixel value of an input image is expressed as white and non-use of 100% of a pixel value of an input image is expressed as black. Once the process of S22 is finished, a transition is made to a compositing mask generating process (S32).

Figure 13:
Figure 13:

Meanwhile, in the process of S24, the compositing unit 16 extracts a subject blur region. For example, the compositing unit 16 calculates a difference image in a similar manner to the process of S16 in FIG. 3 and extracts a region with a subject motion likelihood that is equal to or higher than a predetermined value as a subject blur region. FIG. 13(A) shows an example of a difference image including a subject blur region. Once the process of S24 is finished, a transition is made to a labeling process (S26).

In the process of S26, the compositing unit 16 labels subject blur regions. The compositing unit 16 sets one label $R_n$ to a continuous subject blur region. FIG. 13(B) shows an example of labeled continuous regions. Once the process of S26 is finished, a transition is made to a reference image selecting process of each region (S28).

In the process of S28, the compositing unit 16 sets a reference image for each subject blur region. Basically, the compositing unit 16 prioritizes a high-exposure image. For example, when compositing the input image $I_{0'''}$ and the input image $I_{1'''}$, the input image $I_{1'''}$ is selected as the reference image. However, when a subject blur region is affected by a "whiteout" region in the input image $I_{1'''}$, the input image $I_{0'''}$ is selected as the reference image. Once the process of S28 is finished, a transition is made to a subject blur mask generating process (S30).

Figure 14:
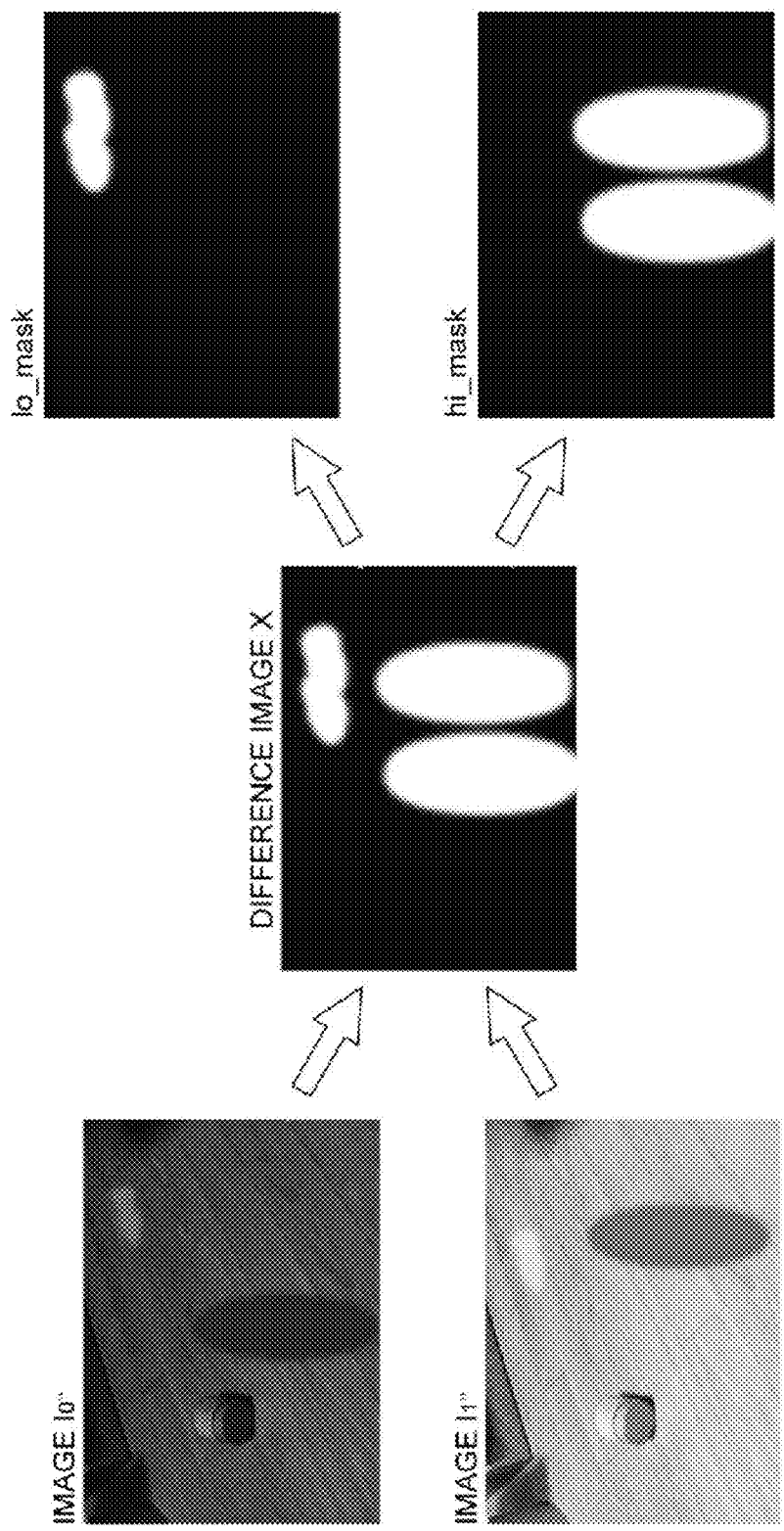
FIG. 14 is a schematic diagram explaining a flow of a subject blur mask generating process.

In the process of S30, the compositing unit 16 generates a subject blur mask for each subject blur region. When a high-exposure image is prioritized to be the reference image, the compositing unit 16 generates a second mask. On the other hand, when a low-exposure image is prioritized to be the reference image, the compositing unit 16 generates a first mask. FIG. 14 is a schematic diagram explaining the series of processes from S24 to S30. As shown in FIG. 14, when compositing the input image $I_{0'''}$ and the input image $I_{1'''}$, a difference image X is obtained, and a first mask (lo_mask) or a second mask (hi_mask) is generated for each region in the difference image. In other words, in a region in which the subject moves, by using the subject blur mask to let the pixel values input only from a single image, the ghost phenomenon described earlier can be avoided. Once the process of S30 is finished, a transition is made to the compositing mask generating process (S32).

Figure 15:
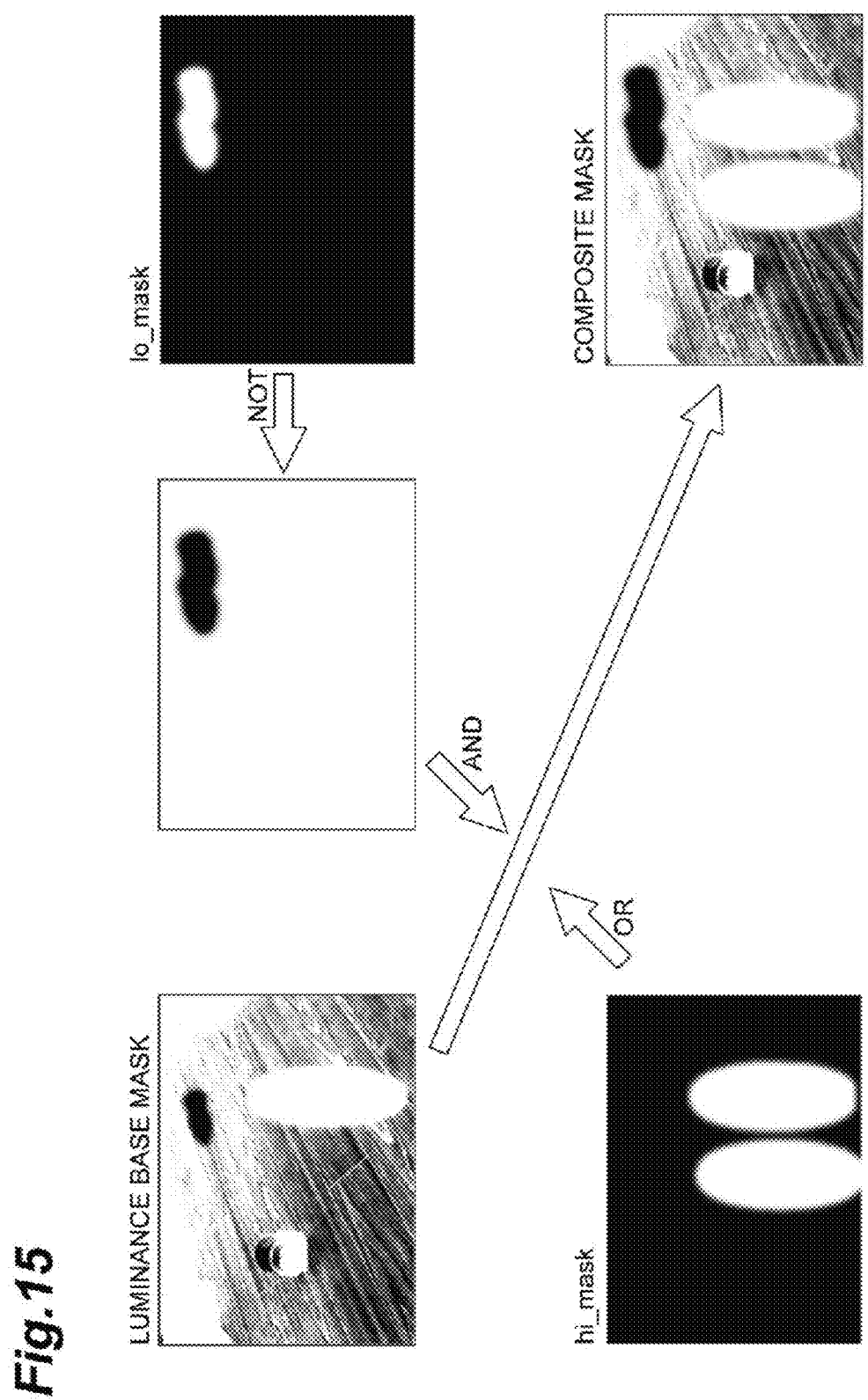
FIG. 15 is a schematic diagram explaining a flow of a compositing mask generating process.

In the process of S32, the compositing unit 16 generates a compositing mask based on a luminance base mask and a subject blur mask. FIG. 15 is a schematic diagram explaining a compositing mask generating process. As shown in FIG. 15, the luminance base mask is multiplied by an inverted image of the lo_mask. In addition, the hi_mask is added to the luminance base mask. Through such combinations, a compositing mask is generated. Once the process of S32 is finished, a transition is made to a compositing process (S34).

In the process of S34, a compositing process is performed by the compositing unit 16 according to the compositing mask created in the process of S32. Moreover, when a luminance value $P_0$ of an image already composited and a luminance value $P_1$ of an input image to which the exposure transform function is applied are composited at a weight a, a luminance value $P_2$ after composition can be obtained by the following expression.

$$P_2 = (1-a) \cdot P_0 + a \cdot P_1 \qquad \text{[Expression 5]}$$

In this case, with the image having the lowest exposure, an entire region thereof is composited as-is. Once the process of S34 is finished, a transition is made to an input screen confirming process (S36).

In the process of S36, a judgment is made on whether or not the compositing unit 16 has composited all input images. If all of the input images have not been composited, a transition is made to the processes of S22 and S24. Subsequently, for example, a compositing process of a composite image $O_0$ of the input image $I_{0'''}$ and the input image $I_{1'''}$ with a new input image $I_{0'''}$ is performed as shown in FIG. 10. On the other hand, if all of the input images have been composited, the control process shown in FIG. 9 is concluded.

By executing the control process shown in FIG. 9, a subject blur-corrected HDR composite image is generated.

Next, an image compositing program that causes the mobile terminal (computer) 2 to function as the aforementioned image compositing device 1 will be described.

The image compositing program comprises a main module, an input module, and an arithmetic processing module. The main module is a portion that provides integrated control over image processing. The input module causes the mobile terminal 2 to operate so as to acquire an input image. The arithmetic processing module comprises a motion information acquiring module, a likelihood calculating module, an exposure estimating module, a motion correcting module, and a compositing module. Functions that are realized by executing the main module, the input module, and the arithmetic processing module are respectively similar to the functions of the image input unit 10, the motion information acquiring unit 12, the likelihood calculating unit 13, the exposure estimating unit 14, the motion correcting unit 15, and the compositing unit 16 of the image compositing device 1 described earlier.

For example, the image compositing program is provided by a recording medium such as a ROM or by a semiconductor memory. Alternatively, the image compositing program may be provided via a network as a data signal.

As described above, the image compositing device 1, the image compositing method, and the image compositing program according to the present embodiment calculate a likelihood of a motion of a subject at each pixel based on a difference between a first image and a second image before conforming the exposures of the first image and the second image to each other. Subsequently, based on the likelihood of motion of the subject, an exposure transform function that conforms the exposure conditions of the first image and the second image to each other is estimated. Since a likelihood of motion of the subject is considered when conforming exposures to each other in this manner, for example, exposures can be conformed to each other with the exception of a region in which a change in color may have occurred due to a motion of a subject. Consequently, an appropriate composite image can be generated. Furthermore, a subject blur mask can be used to prevent an occurrence of a subject blur (a ghost-like representation), and thereby it is possible to produce a clear image.

The embodiment described above represents an example of the image compositing device according to the present invention. The image compositing device according to the present invention is not limited to the image compositing device 1 according to the embodiment, and the image compositing device according to the embodiment can be modified or applied in various ways without departing from the spirit and the scope of the claims.

For example, while an example in which the camera 20 acquires a frame image has been described in the respective embodiments above, an image may be transmitted via a network from another device. Alternatively, when a composite image is to be only recorded and not displayed, the display unit 21 need not be provided.

Alternatively, the image compositing device 1 according to the respective embodiments described above may be operated together with a camera shake correcting device.

REFERENCE SIGNS LIST 1 image compositing device
10 image input unit (input unit)
12 motion information acquiring unit
13 likelihood calculating unit
14 exposure estimating unit
15 motion correcting unit
16 compositing unit

The invention claimed is:

1. An image compositing device configured to generate a composite image using a first image and a second image having different exposure conditions, the image compositing device comprising:
an input unit configured to input the first image and the second image;
a likelihood calculating unit configured to calculate a subject motion likelihood at each pixel based on a difference between the first image and the second image before estimating an exposure transform function for conforming the exposure conditions of the first image and the second image to each other;
an exposure estimating unit configured to estimate the exposure transform function based on the subject motion likelihood; and a compositing unit configured to composite the first image and the second image by using the exposure transform function.

2. The image compositing device according to claim 1, wherein the likelihood calculating unit is further configured to normalize pixel values of the first image and the second image, and to calculate the subject motion likelihood at each pixel based on a difference between the normalized first images and the normalized second images.

3. An image compositing device configured to generate a composite image using a first image and a second image having different exposure conditions, the image compositing device comprising:
   an input unit configured to input the first image and the second image;
   a likelihood calculating unit configured to calculate a subject motion likelihood at each pixel based on a difference between the first image and the second image;
   a compositing unit configured to composite the first image and the second image by using the exposure transform function, wherein
   the likelihood calculating unit is further configured to use a plurality of first processed images obtained by respectively intergrading resolutions of the first image and a plurality of second processed images obtained by respectively intergrading resolutions of the second image for calculating a difference of each pixel for each resolution, and to calculate the subject motion likelihood at each pixel by weighting a difference obtained for each resolution.

4. The image compositing device according to claim 3, wherein the likelihood calculating unit is further configured to weight the difference obtained for each resolution based on a reliability of the difference between the first image and the second image and based on an image size or a resolution of the first processed image or the second processed image.

5. The image compositing device according to claim 1, wherein the exposure estimating unit is further configured to select a sampling point for deriving the exposure transform function based on the subject motion likelihood at each pixel.

6. The image compositing device according to claim 1, wherein the exposure estimating unit is further configured to determine a weight of a sampling point for deriving the exposure transform function based on the subject motion likelihood at each pixel.

7. The image compositing device according to claim 6, wherein determination is made by the exposure estimating unit so as to make the weight of the sampling point for deriving the exposure transform function smaller as the subject motion likelihood at each pixel becomes higher.

8. The image compositing device according to claim 1, wherein
   the compositing unit is further configured to calculate a subject motion likelihood at each pixel based on a difference between the first image and the second image, and composites the first image and the second image by using the subject motion likelihood and the exposure transform function.

9. The image compositing device according to claim 1, wherein
   the compositing unit is further configured to
   generate a luminance base mask representing a composition ratio of pixel values of the first image and the second image based on a magnitude of an original luminance value of the first image or the second image,
   generate a subject blur mask representing a composition ratio of pixel values of the first image and the second image based on the difference between the first image and the second image, and
   combine the luminance base mask and the subject blur mask to generate a compositing mask for compositing pixel values of the first image and the second image.

10. The image compositing device according to claim 9, wherein
    the compositing unit is further configured to
    calculate a subject motion likelihood at each pixel based on a difference between the first image and the second image, and
    generate the subject blur mask based on the subject motion likelihood.

11. The image compositing device according to claim 10, wherein
    the compositing unit is further configured to
    use a plurality of first processed images obtained by respectively intergrading resolutions of the first image and a plurality of second processed images obtained by respectively intergrading resolutions of the second image for calculating a difference of each pixel for each resolution, calculate the subject motion likelihood at each pixel by weighting the difference obtained for each resolution, and generate the subject blur mask based on the subject motion likelihood.

12. The image compositing device according to claim 11, wherein
    the compositing unit is further configured to detect regions in which pixels with a subject motion likelihood being equal to or lower than a predetermined threshold are adjacent to each other, to attach an identification label to each region, and to generate the subject blur mask for each region.

13. The image compositing device according to claim 9, wherein
    the compositing unit is further configured to generate, as the subject blur mask, a first mask that forces a pixel value with a lower luminance value to be selected from among the first image and the second image or a second mask that forces a pixel value with a higher luminance value to be selected from among the first image and the second image.

14. The image compositing device according to claim 13, wherein
    the compositing unit is further configured to generate the compositing mask by multiplying the luminance base mask with an inverted mask of the first mask or by adding the second mask to the luminance base mask.

15. The image compositing device according to claim 1, further comprising
    a motion information acquiring unit configured to acquire motion information of a pixel between the first image and the second image, wherein
    the likelihood calculating unit is further configured to correct the first image and the second image based on the motion information, and to calculate the subject motion likelihood at each pixel using the corrected first and second images.

16. The image compositing device according to claim 1, wherein the first image comprises an image being a composite of images with different exposure conditions.

17. An image compositing method for generating a composite image by using a first image and a second image having different exposure conditions, the image compositing method comprising:

inputting the first image and the second image;

calculating a subject motion likelihood at each pixel based on a difference between the first image and the second image before estimating an exposure transform function for conforming the exposure conditions of the first image and the second image to each other;

estimating the exposure transform function based on the subject motion likelihood; and compositing the first image and the second image by using the exposure transform function.

18. A recording medium on which is recorded an image compositing program that causes a computer to operate so as to generate a composite image by using a first image and a second image having different exposure conditions, wherein the image compositing program recorded on the recording medium causes the computer to operate as:

an input unit that inputs the first image and the second image;

a likelihood calculating unit that calculates a subject motion likelihood at each pixel based on a difference between the first image and the second image before estimating an exposure transform function for conforming the exposure conditions of the first image and the second image to each other;

an exposure estimating unit that estimates the exposure transform function based on the subject motion likelihood; and a compositing unit that composites the first image and the second image by using the exposure transform function.

19. An image compositing method for generating a composite image by using a first image and a second image having different exposure conditions, the image compositing method comprising:

inputting the first image and the second image;

calculating a subject motion likelihood at each pixel based on a difference between the first image and the second image;

compositing the first image and the second image by using the exposure transform function; and using a plurality of first processed images obtained by respectively intergrading resolutions of the first image and a plurality of second processed images obtained by respectively intergrading resolutions of the second image for calculating a difference of each pixel for each resolution;

calculating the subject motion likelihood at each pixel by weighting a difference obtained for each resolution.

* * * * *